Aug. 21, 1934.  J. W. WELCH ET AL  1,970,638
LUBRICANT FITTING
Filed Nov. 10, 1931
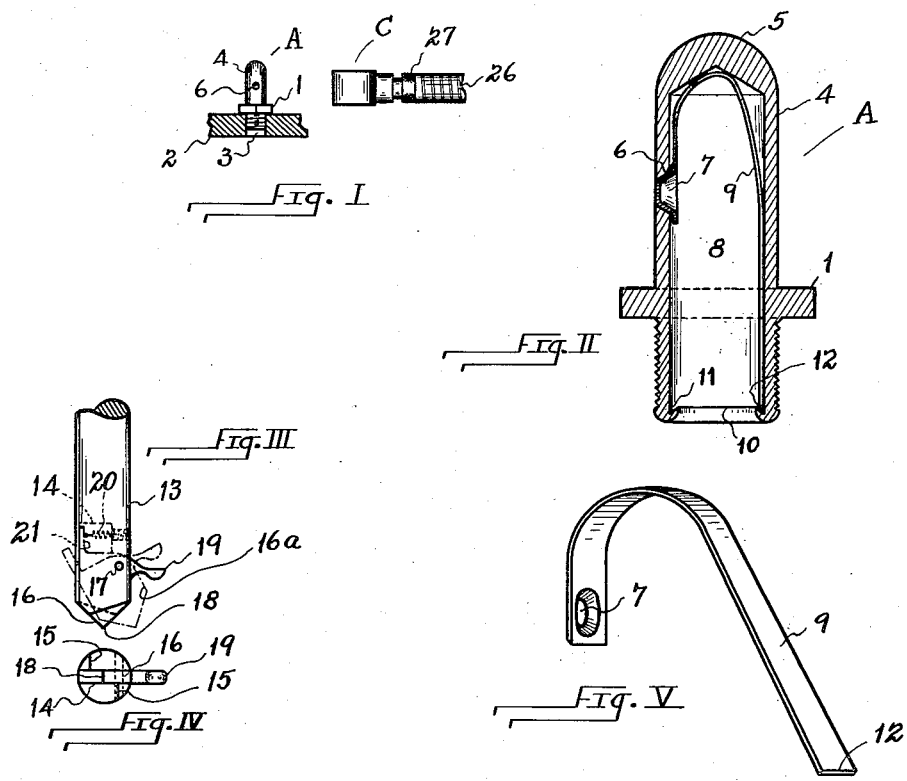
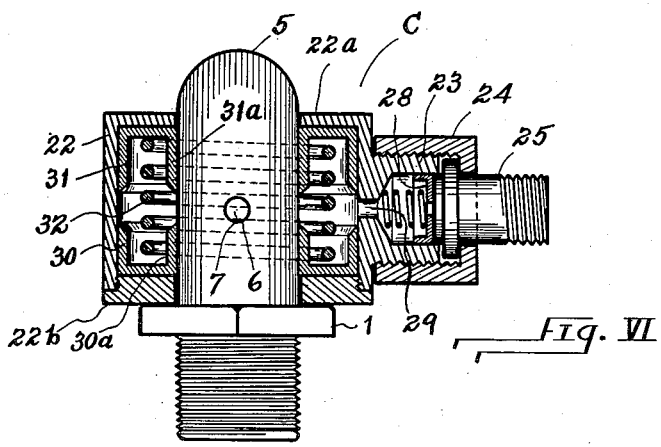
INVENTOR
James W Welch and
Raymond P Suess
by Christy Christy and Wharton
their attorneys Patented Aug. 21, 1934

1,970,638

UNITED STATES PATENT OFFICE 1,970,638

LUBRICANT FITTING

James W. Welch, Oakland, Calif., and Raymond P. Suess, Pittsburgh, Pa.

Application November 10, 1931, Serial No. 574,107

1 Claim. (Cl. 184—105)

Our invention relates to equipment for use in high pressure lubricating systems, and more specifically concerns a fitting or fixture which is adapted to be secured at the mouth of a lubricant passage; a passage, that is to say, through which communication is had for charging grease or oil to the parts to be lubricated. The fixture serves as means by which connection is made to a supply of lubricant, to the end that the supply of lubricant may be placed under pressure and forced through the fixture and to the parts to be lubricated. Ordinarily, a lubricant pump is provided, and a flexible conduit extends from the pump and is connected to the fixture, and lubricant is forced by way of the conduit through the fixture. Means are provided at the end of such flexible conduit, so that the connection between the fixture and conduit may be quickly and effectively made; such means is called an adapter in the parlance of the art, and we, in addition to providing a simplified and improved lubricant fixture, have provided an adapter having many advantageous characteristics.

The fixture may be economically manufactured. It is a fixture which in service is closed throughout, leaving no corners, openings, edges, pockets, or indentations in which grit or dirt can accumulate and eventually work its way, or be carried by incharged lubricant, into the parts to be lubricated. Still other objects and advantages will present themselves in the following specification.

Fig. I of the accompanying drawing shows the fixture and adapter in side elevation. This illustration indicates the relatively small size or dimensions in which the simplified fixture and adapter of our invention can be produced. Fig. II is a view of the fixture in vertical section, and to larger scale. Fig. III illustrates fragmentarily in side elevation a tool which is particularly adapted for one of the manufacturing steps in producing the fixture. Fig. IV is a plan view of the tip of said tool. Fig. V is a view in perspective of an internal element of the fixture. Fig. VI is a view showing the fixture in side elevation, and showing, partly in vertical section and partly in side elevation, the adapter of our invention, associated therewith.

The fixture A comprises a hollow body having intermediate its extent a laterally-extending flange 1 which is shaped as a hexagonal nut. Below the flange or nut 1 the base of the body is threaded, affording means for securing the fixture in the wall 2 in customary manner (cf. Fig. I). The wall 2 may be the wall of a lubricant reservoir, or the wall of a bearing, in which wall a threaded hole 3 is provided for the reception of the fixture (A). The hole 3 may, indeed, be the entrance to a passage of considerable length, communicating with the parts to be lubricated. In any case the fixture A is adapted to be secured at the mouth of the hole (or passage), and there the fixture normally comprises a closure through which, by means of instrumentalities below described, communication may be established with the parts to be lubricated.

Above the nut 1 the fixture A comprises a nipple 4, the nipple having a closed, rounded tip 5, the tip being rounded to obtain advantages presently to be described. The nipple is closed to the atmosphere, and includes in its side wall an inlet orifice 6, through which lubricant may obtain admission to the hole or passage 3. It will be perceived that the nipple presents externally a smooth continuous surface, forming no corners, openings, edges, pockets, or other indentations in which dirt and grit may accumulate. Accordingly, when the adapter C is seated on the nipple to effect charging of grease, the usual and objectionable tendency of accumulated dust or dirt to enter the passage 3 is eliminated. The fixture A is particularly adapted for service in automobiles, and, if in such service the fixture happens to become fouled with mud or other dirt, it will be manifest that the smooth, regular, external surface of the nipple admits of ready and thorough cleansing. These are characteristics of great merit.

The inlet 6 is inwardly tapering in form, and is normally closed by a cap 7; the cap 7 is yieldingly retained within the bore 8 of fixture A, and is adapted to shift inwardly under the lubricant pressure which is produced on the wall of nipple 4, to uncover the inlet 6. That is to say, the cap 7 seats in the inlet 6, and is yieldingly retained in seated position until pressure is applied to the external wall of the nipple. Upon such application of pressure the cap 7 gives way inwardly of the nipple and uncovers the inlet 6. Advantageously the cap 7 is embossed or otherwise provided on a leaf spring 9, and the leaf spring is secured within the fixture (as shown in Fig. II). The inherent elasticity of leaf spring 9 is effective to maintain the cap 7 in its seated position, permitting the cap, however, to yield inwardly as above explained. We have found that the bottom edge 10 of the fixture may be "spun" to the shape illustrated in Fig. II, providing a detent, i. e. a small V-shaped ledge 11 for the reception of the tip 12 of the spring. This structure is both economical and expedient; it permits the leaf spring structure to be "sprung" into its operative position in the fixture (Fig. II). When so sprung into operative position within the fixture A, the inherent resiliency of the strip 9 co-operates with the detent 11, to maintain the strip in position substantially within the bore of the fixture. It will be observed that in this case the top and side walls of the bore 8 cooperate with the ledge 11, to secure to parts in such position of service.

It is of importance to provide the inlet 6 with an inwardly-diverging taper—the taper affording a more snug seating of the cap 7, and preventing any possibility of the cap sticking in the inlet when lubricant is presented to it. To our knowledge no one has been able hitherto to provide in commercial production a nipple having a small inwardly tapered hole, particularly when the wall in which the hole is to be formed is thin and the fixture itself small. Indeed, we have devised a novel tool to do the job with the speed and precision required in present day practice.

The essential elements of the tool appear in Figs. III and IV of the drawing. The tool comprises a drill shank, the reference numeral 13 being applied thereto. The working end of the tool is slotted at 14, and the portions of the shank on each side of the slot are tapered and pointed, to provide cutting edges 15. In the slot 14 a blade 16 is pivotally secured on a pin 17, and this blade is tapered, providing a drill point 18. The blade 16 includes a laterally projecting arm 19, and normally the blade (with the exception of the arm 19 and the point 18) lies within the shank 13. The center of gravity of the blade 16 is so determined, and the blade is so pivoted, that the centrifugal forces, which are produced when the drill is rapidly rotated for service, cause the blade to remain substantially within the shank as above explained. If desired, a spring 20 may be organized with a leg 21 on the blade, to assist the centrifugal forces in the manner indicated. In operation the tool is rotated and is pressed into the side wall of the nipple 4, similar to the manipulation of an ordinary drill. Accordingly, the point of the tool cuts an orifice and enters the bore 8 of the fixture, until, during inward movement, the arm 19 contacts the exterior surface of the nipple. Thereupon, the feeding of the rotating drill being continued, the blade 16 is swung outward, presenting the side cutting edge 16a of the blade at an angle to the axis of the shank 13. The inclined blade 16a will machine the desired inwardly tapering orifice 6. It may be remarked that conveniently the fixture is cut and formed from a square or hexagonal brass bar or tube, and that the above-defined drilling is accomplished before turning the nipple 4 to its illustrated shape.

Turning our attention to the adapter C, we remark that in the case of the adapter, as well as in the case of the fixture A, the problem has been to provide a structure such in character as will admit of mass production in automatic machinery. Upon understanding that the requirements of the automotive trade specify a lubricant fixture which projects less than one inch (preferably as low as five-eighths of an inch) from the part wherein it is secured, it at once will be evident to the machinist and engineer that the provision of our device has overcome many serious problems. Of course, the illustrations in the drawing, with the exception of Fig. I, are many times larger than the parts will ordinarily be produced commercially.

The adapter C comprises a cup-shaped body 22 from which an externally threaded stem 23 extends. A shouldered connector 25 is revolubly secured in well-known manner to the stem 23, the coupling member 24 serving to this end. The connector 25 affords means for uniting the adapter C to a high pressure lubricant supply line—ordinarily the supply line will be a flexible metal tube 26 (Fig. I) extending from a lubricant pump (not shown), and any well known coupling may be employed to effect the union of the tube (26) and the connector (25).

The stem 23 is bored to receive a spring-backed, flexible washer 28. An opening 29 communicates from the stem to the interior of the body 22; a passage is formed in the washer, and the connector 25 is tubular, whereby communication is established between the lubricant supply and the interior of the adapter body 22. The spring-backed washer 28 seats upon the inner end of the connector 25, insuring a fluid-tight joint.

The body 22 of the adapter is closed at its top and bottom, save for a central opening through each. These openings in service receive the nipple 4 of the fixture, as shown in Fig. VI. Within the body 22 two seals are provided; the seals are responsive to the pressure of lubricant entering the adapter, to effect a securing of the adapter tightly upon the nipple. Advantageously, the seals comprise each a cup washer of leather, rubber, or of other suitable yielding material. The two washers (the numerals 30 and 31 are applied thereto) are arranged in opposition to each other, and a spring 32 is disposed between the opposed washers, maintaining them in such position of separation as to clear the inlet 6 of the fixture A, and to clear the entrance 29 of the adapter. Manifestly, the structure of the adapter is such that it may be freely seated over the nipple 4, the rounded nose or tip 5 of the nipple facilitating the positioning of the adapter and guiding the vertical flanges 30a, 31a of the cup washers into place against the side wall of the nipple.

When the adapter has been so seated upon the fixture A, the entrance of lubricant under high pressure is effected, that is, under the control of the usual valve (not shown) lubricant is charged through the conduit 26 and into the adapter. By reason of the structure and disposition of the seals (30, 31), the high lubricant pressure effects an expansion of the seals—the flanges 30a and 31a are pressed with great force against the side wall of the nipple at points above and below the nipple inlet 6. Accordingly, the pressure, in being of its usual intensity of several thousand pounds per square inch, is instrumental in rigidly securing the adapter upon the nipple. In addition the lubricant forces the cap 7 inwardly, and enters the fixture A and flows into the lubricant passage 3. It will be observed that the pressure of the lubricant is distributed with equal effect on opposite sides of the inlet 6, whereby there is no tendency for the adapter to be forced from its seated position on the nipple. Indeed, no special lock is necessary to secure the adapter on its seat, and the cup washers 30, 31, in addition to serving in effect as a lock, serve also as means for sealing the adapter on the nipple, insuring against the escape of lubricant.

When the charging of lubricant has been completed the pressure is removed from line 26, and the pressure correspondingly falls within the adapter. Manifestly, the failure of pressure frees the adapter for removal. In this case we have shown one end wall 22a of the adapter body to be formed integrally with the rest of the adaptor body, and the opposite wall thereof is shown to be a cap 22b, screwed home in threaded engagement with the body 22. Such structure permits the parts to be easily manufactured and assembled, and the screwing in of the cap 22b compresses the spring that it serves exceedingly well in its intended capacity.

We claim as our invention:

A lubricant fitting comprising a small, cylindrical, tubular body which is closed at its top and open at its bottom, an inlet in the side wall of said body, a detent provided in said body, a closure for said inlet, and a resilient strip bearing at its one end against said detent and extending upward into said tubular body and contacting the side wall thereof, said strip continuing in a bend which is supported or backed by the top portion of said body, whence said strip continues down the opposite side wall of said body and yieldingly secures adjacent its opposite end said closure in place in said inlet.

JAMES W. WELCH.
RAYMOND P. SUESS.